(12) United States Patent
Eccles

(10) Patent No.: US 6,280,637 B1
(45) Date of Patent: Aug. 28, 2001

(54) TREATMENT OF LIQUID WASTE

(76) Inventor: Christopher Robert Eccles, Westgate House, Dedham, Colchester, Essex CO7 6HJ (GB)

( * ) Notice: Subject to any disclaimer, the term of this patent is extended or adjusted under 35 U.S.C. 154(b) by 0 days.

(21) Appl. No.: 09/485,919

(22) PCT Filed: Aug. 20, 1998

(86) PCT No.: PCT/GB98/02506

§ 371 Date: Feb. 18, 2000

§ 102(e) Date: Feb. 18, 2000

(87) PCT Pub. No.: WO99/10285

PCT Pub. Date: Mar. 4, 1999

(30) Foreign Application Priority Data

Aug. 22, 1997 (GB) .................................................. 9717775

(51) Int. Cl.[7] .................................................. C02F 1/46
(52) U.S. Cl. .......................... 210/748; 210/205; 210/908; 204/290.01; 205/759; 205/761; 205/695
(58) Field of Search .................................. 210/601, 748, 210/763, 205, 908, 757; 204/290.01, 275.1; 205/759, 761, 695

(56) References Cited

U.S. PATENT DOCUMENTS

| | | | |
|---|---|---|---|
| 3,673,065 | * | 6/1972 | Anderson .............................. 204/149 |
| 4,179,347 | | 12/1979 | Krause et al. ........................ 204/149 |
| 4,292,175 | | 9/1981 | Krause et al. ........................ 210/192 |
| 4,828,718 | * | 5/1989 | Habermann et al. ................. 210/763 |
| 4,861,484 | * | 8/1989 | Lichtin et al. ....................... 210/763 |

FOREIGN PATENT DOCUMENTS 19512955  10/1996 (DE).
2321646   8/1998  (GB).

* cited by examiner

*Primary Examiner*—David A. Simmons
*Assistant Examiner*—Frank M. Lawrence
(74) *Attorney, Agent, or Firm*—Dann, Dorfman, Herrell and Skillman, P.C.

(57) ABSTRACT

An electrocatalytic process for treating liquid waste material containing at least one environment-polluting substance, comprising causing the liquid waste material to be treated to pass between and to contact at least one pair of spaced apart electrodes, across which a dc potential difference is applied, to cause the at least one environment-polluting organic substance to be at least partially decomposed into a gaseous or liquid form. The invention also relates to a treatment unit for performing the process.

16 Claims, 2 Drawing Sheets

TREATMENT OF LIQUID WASTE

This invention relates to an electrocatalytic process for treating liquid waste or effluent. In particular, but not exclusively, the invention can be used to breakdown long chain fat and related type molecules into basic gaseous elements, hence reducing the fats, oils, greases and similar wastes content in effluent discharges which can cause serious blockages in discharge pipes and problems in sewerage treatment plants.

The use of electrolysis is known as a means to help separate fats and oils from liquid waste. U.S. Pat. No. 5,593,598 discloses the use of ozone injection and alternating direct current to convert oil and grease contaminated cleaning solutions back to useful polar water soluble surfactants, emulsifiers, etc.

EP-A-0323690 discloses the use of proton addition by magnetic fluxing to help separate oils and waste water. WO-A-86/07586 discloses the use of an electrolytic field to help the formation of oily contaminants into a "floc" for easier removal. U.S. Pat. No. 5,531,865 discloses the use of an electrolytic field to oxidise partially fats and greases and to increase their absorbability with the use of flocculating agents. GB-A-1520299 discloses the use of electrodes surrounding a closely spaced flow channel in which foaming and flocculation occurs to collect fats.

All these known disclosures describe the use of electrical forces to aid separation of the fats, greases and oils into a floc or the like which can be more easily removed. However, physical removal is still required, e.g. by skimming, sedimentation, filtration or other means, and the resultant waste fats and the like which are collected still need to be re-processed or disposed of.

Fats, oils and greases can be separated from liquid waste by more traditional methods such as dissolved air flotation (DAF); aerobic digestion (AD); and the use of grease traps with or without biological additions. DAF involves high energy costs and still requires the physical separation and disposal of fats. The AD process variant is a common system for treating a range of organic wastes and involves the use of large cumbersome plant. With high fat concentration in the waste, the air injection needs to be greatly increased resulting in large energy costs. Grease traps are merely physical collectors, often subject to maloperation, and require physical removal and disposal elsewhere of collected fatty waste.

According to one aspect of the present invention there is provided an electrocatalytic process for treating liquid waste material.

According to another aspect of the present invention there is provide a treatment unit for performing the process according to said one aspect of the present invention.

Embodiments of the invention will now be described, by way of example only, with particular reference to the accompanying drawings, in which:

FIG. 1b shows a modification of the treatment unit shown in FIG. 1a;

Figure 1A:
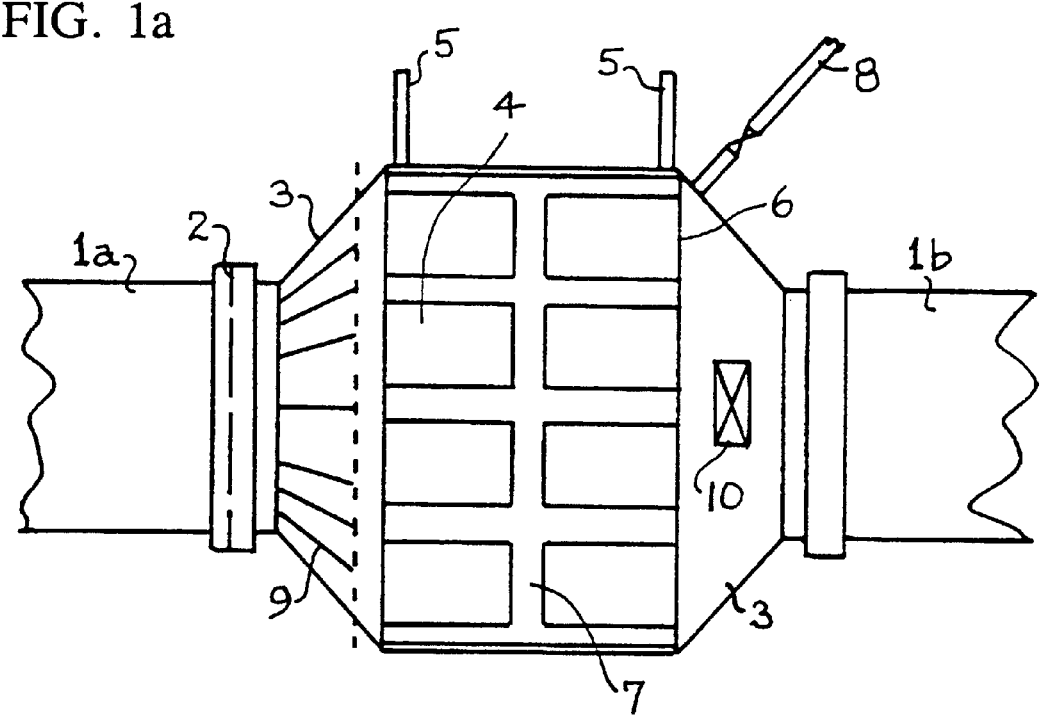
FIG. 1a is schematic cross sectional view from the side of a "stand alone" in-line treatment unit for performing the treatment process according to the invention.

FIG. 1a shows a treatment unit for electrocatalytically treating liquid waste material containing at least environment-polluting substance, especially organic substances such as fatty acids, fats, oils and greases. The liquid waste material enters the treatment unit via a conduit 1a in the form of a pipe, duct or trough and leaves via a similar conduit 1b. The liquid waste may, if required, pass through a cleanable coarse filter 2 before entering the treatment unit.

The treatment unit suitably has a square or rectangular cross-section and has expansion joining ducts 3 at the entry and exit designed and shaped to join the round or square ends of the conduits 1a and 1b to the square or rectangular treatment unit entry and exit cross-sections. The amount of expansion will be calculated in each case to suit the optimum sizing for the treatment unit.

Within the treatment section of the treatment unit a plurality of electrode plates 6 are mounted on a frame which provides conductors for the electrical connection of the plates to an electrical control system via shell connectors 5.

The system of electrode plates 6 may comprise one electrode plate set (or pair) 4, or a number of electrode plate sets placed adjacent to each other. The plates are mounted parallel with each other. Preferably the plates 6 are arranged horizontally or at an angle to the horizontal but may instead be placed at least substantially vertically. In the preferred non-vertical arrangement, the top plate is the cathode and is typically manufactured from steel, e.g. mild steel or stainless steel, bar plated with nickel, cadmium or titanium (or combinations thereof) and subsequently machined to provide a number of ferro-nickel, ferro-cadmium and/or ferro-titanium interfaces on the surface. The lower plate of each pair is the anode and is made from uncoated stainless steel bar stock. Individual parts may be insulated from each other or alternate plates placed sequentially.

A typical method of manufacturing a nickel coated cathode is to take a sheet or bar of ordinary mild steel as the substrate and to create on its surface a series of irregularities, in the form of trough regions and raised regions, by etching the steel in a bath of concentrated (50–55%) sulphuric acid. The natural impurity of most commonly available mild steel ensures that etching will take place in a random and irregular manner. Mostly, this is caused by the presence of finely divided granular alpha-ferrite which appears to be preferentially attacked by the acid. After inspection of the surface and the determination of the average size of the nodes or raised regions on the roughened steel (optimally these should be at 0.03–0.05 mm distribution), the surface is passivated in concentrated nitric acid and further passivated in a chromic acid bath. The roughened surface of the steel substrate is then given a 25-micron coating of nickel by the "electroless" process, also known as auto-catalytic chemical deposition. This plating process provides accretion of deposited nickel in the trough regions and thinner deposits of nickel on the raised regions. After coating, the electrode is machined or ground, e.g. using a finishing sander and 120 grit silicon carbide paper belt, to remove the "peaks" of the plated raised regions and in particular to remove the plated nickel from these "peaks" so as to expose the steel of the substrate. In this way a plurality of metal-to-metal interfaces are created on the active surface of the cathode between the nickel plated regions on the trough regions of the substrate and the exposed steel surfaces of the substrate. Constant microscopic inspection is required to determine the existence of the correct bi-metallic interfaces on the active surface of the electrode. Finally the electrode is cleaned in methyl ethyl ketone to remove grease and other machining deposits. This method of manufacture is described in more detail in GB-A-2321646.

An alternative method of manufacturing a cathode involves preparing a sheet of mild steel for plating by polishing the steel plate to a 600 grit standard. Prior to plating all sharp edges are rounded, typically to a 1 cm radius or less, e.g. about 1 mm, for those specific edges adjacent the active cathode face. A layer of nickel, typically having a thickness of from 50–100 micron, is then provided over the entire plate, preferably by an electroless nickel coating process. After this, the active cathode face is skimmed or scored to provide random "valleys" or recesses on the nickel coated steel to produce nickel/steel interfaces over a proportion, e.g. about 25%, of the clad or plated surface. The reverse side of the cathode, i.e. opposite the active cathode face, if immersed in the effluent, may be coated with a covering, e.g. a low temperature setting silicone-based rubberised covering or the like, to ensure that the surface is inert relative to adjacent edges of the plate.

The clearance between the anode and cathode of each plate set will typically be 50–100 mm. although larger or smaller clearances may also be used dependent on waste stream conditions and treatment requirements. Typically the voltage between plates will vary from 5 to 100 volts DC.

The sizing of the treatment unit and the plate arrangement depends on the concentration of fats and oils in the waste stream and the volume flow rate. In use, the electrocatalytic process causes proton-tunnelling in the cathode's ferro-nickel lattice structure. This shifts the ion products of the liquid waste electrolyte resulting in the fat or other pollutant, e.g. organic pollutant, present in the liquid waste donating a proton to the lattice, this destabilising the end of the fat chain and releasing hydrogen gas.

The treatment process is activated adjacent to the cathode and the function of the anode is merely to provide a return path for current. It is necessary therefore to ensure the liquid waste is made to flow close to the cathode for sufficient time to allow the above reaction to proceed for the bulk of the liquid waste passing through the treatment unit. The length of the liquid flow path, the number of plate pairs and the flow velocity over them will be adjusted to achieve this objective.

Where long electrode length is necessary it is likely that the electrodes will be sectioned (or split) to form a number of elements in service (see item 7). This may be necessary to provide voltage and current control. In addition such an arrangement provides spaces for upward rising released gases to pass to a gas discharge off-take 8 at the top of the treatment unit for subsequent collection, venting or burning off.

On some installations it may be necessary to insert flow disturbers 9 at the entry to the electrode channels to ensure turbulence of the stream and improve contact with the cathode.

On large units access doors 10, e.g. sealed, removable plates, may be provided on the inlet and/or outlet duct 3 while on smaller units the whole assembly may be readily demountable with quick fit flanges.

Figure 1B:
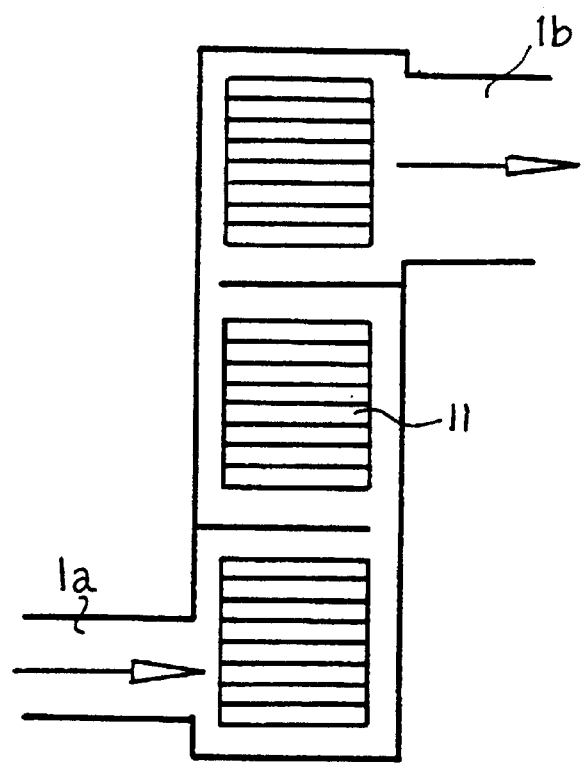

In some arrangements a multi-pass liquid flow path across arrays 11 of electrode pairs may be provided as schematically shown in FIG. 1b.

Figure 2:
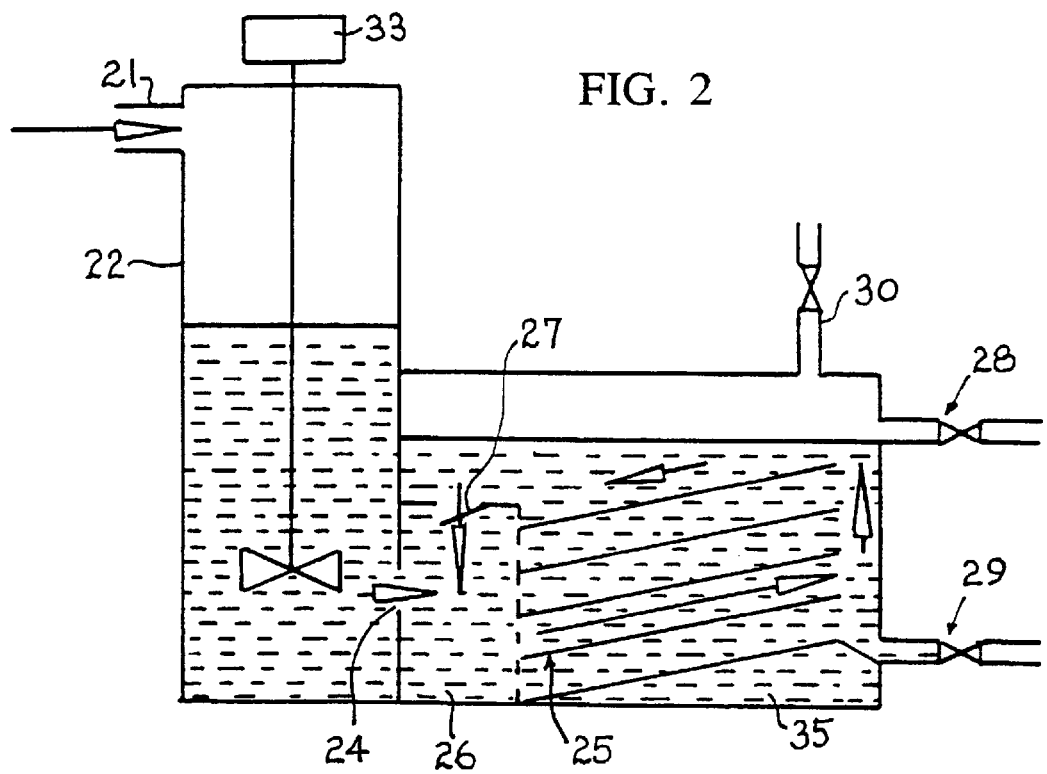
FIG. 2 is a schematic cross-sectional view of a stand alone batch treatment chamber for performing the treatment process according to the invention.

An alternative arrangement is shown in FIG. 2 where a treatment unit receives, via an inlet pipe 21, effluent containing fatty wastes. In some cases, such as wastes from fast food chain outlets, hotels, hospitals, etc., the effluent will arrive in spasmodic batches as the waste is produced. Prior to discharge, the waste passes through a high speed, in-line stirrer which, together with the addition of a controlled, small amount of detergent, ensures adequate emulsification of the effluent. The waste is received in a storage tank 22 which contains a reservoir of liquid. The tank 22 feeds a flow treatment unit 35. If necessary an additional stirrer 33 is provided in the tank 22 in order to maintain fats in solution as far as possible.

Waste water is discharged via entry 24 by gravity head into the treatment unit 35 and is directed into an electrode plate system 25 comprising one or more electrode plate pairs of the same design as described previously. The electrodes plates may be horizontally aligned or angled (as shown) in order to aid flow of released gases which finally vent through a chimney unit 30. Effluent flow is constrained to flow back across the top of the plate assembly and will pass back down to the electrode plate entry chamber 26 via a simple one way valve 27. Hence a degree of re-circulation is provided to increase contact time between the waste stream and the cathode faces.

If additional recirculation is required, a pumped offtake from the plate assembly area outlet is provided to feed either into the storage tank or entry pipeline upstream of the emulsifier unit.

A steady off-take of cleaned up liquid effluent exits from the treatment unit 35 via outlet 28 which is sized to match inlet flow via entry 24 and is provided with adjustable means to ensure that the necessary flow balancing is achieved.

A lower outlet 29 is provided for the treatment unit which can be opened manually or by remote initiation to enable the system to be emptied as and when required.

The overall system has to be carefully sized (both in terms of reservoir size, treatment module, and controlled flow rates) in relation to the nature and flow pattern of the waste stream being treated.

Figure 3:
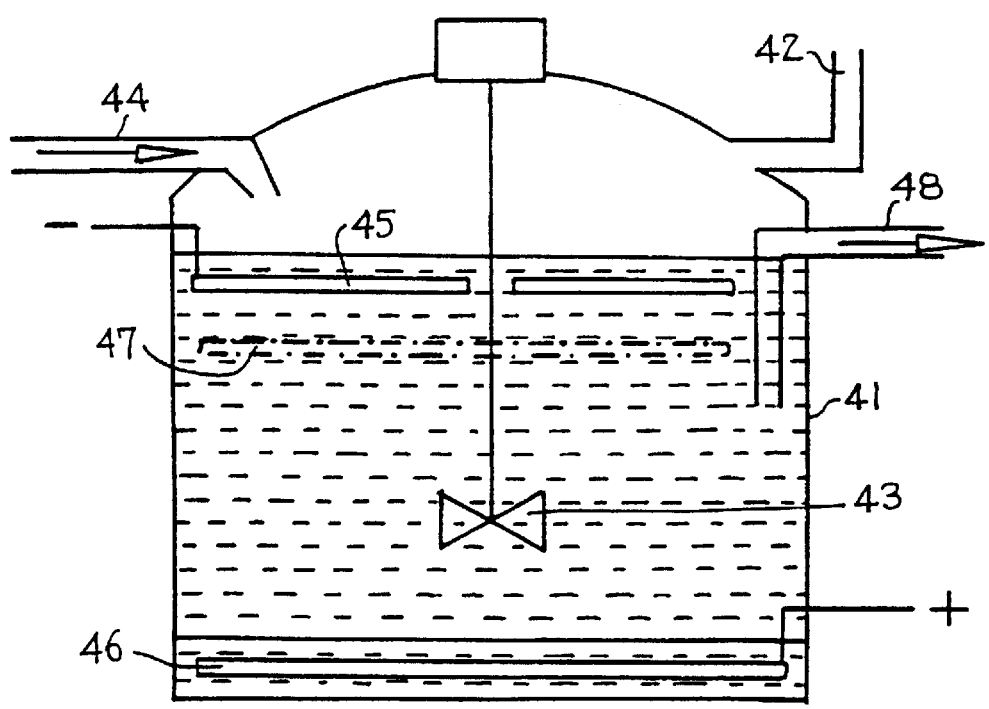
FIG. 3 is a schematic cross-sectional view of an electrode system housed in an anaerobic digester for performing the treatment process according to the invention.

FIG. 3 shows an anaerobic chamber comprising a circular tank 41 provided with a domed top in which a gas collection pipe 42 is located. A stirrer 43 is fitted to mix the contents. Biodegradable liquid effluent waste enters at inlet 44 and remains in the tank for some days during the normal digestion process. In this period the liquid effluent waste circulates within the chamber both due to thermal effects and due to the action of the stirrer 43. Treated liquid effluent exits from the chamber via a top outlet 48.

Within the chamber there is located a cathode 45 of the same construction as described previously and which is arranged horizontally just below the waste liquid level, and a corresponding anode 46 which is located inset in the base of the chamber. Alternatively a different form of anode 47 may be located closely below the cathode 45 if the distance to the base is too great to create the necessary current density. Such an anode 47 is suitably of an open mesh type structure to allow wastes to flow past it.

With this system the electrolytic digester breaks down the long chain fats which will normally retard the main anaerobic digestion process, and therefore allow the AD process to proceed efficiently.

Although the spaced apart electrodes of each electrode pair in the embodiments described are preferably arranged parallel to each other and are flat or plate-like, other forms of spaced apart electrodes, e.g. coaxially arranged electrodes, may be provided.

What is claimed is:

1. An electrocatalytic process for treating liquid waste material comprising passing the liquid waste material to be treated between, and in contact with, electrodes of at least one pair of spaced apart electrodes, the or each electrode pair comprising a steel anode and a cathode spaced therefrom, and applying a dc potential across the electrodes, wherein the liquid waste material contains oily, fatty and/or greasy substances, the or each cathode comprises a substrate of a first material, and a covering layer of a second metallic material, said first metallic material comprising a steel substrate and the second metallic material comprising nickel, cadmium, titanium or a matrix of these materials arranged to provide ferro-nickel, ferro-cadmium or ferro-titanium interfaces contacting the liquid waste material, and the oily, fatty and/or greasy substances are at least partially decomposed by molecular breakdown when close to, or in contact with, the cathode(s) and are dissociated into gaseous or liquid products.

2. A process according to claim 1, wherein said dc potential across the electrodes is from 5 to 100 V.

3. A process according to claim 1, wherein a plurality of electrode pairs are provided and are arranged in parallel to, and/or in series to, a flow direction of the liquid waste material passing between, and in contact with, the electrodes.

4. A process according to claim 1, wherein the electrodes of the or each electrode pair are spaced apart from 50 to 100 mm.

5. A process according to claim 1, wherein electrodes comprise parallel plates which are arranged horizontally, vertically or at an angle.

6. A process according to claim 1, wherein the or each cathode has a plurality of interfaces between said first and second metallic materials which contact said liquid waste material.

7. A process according to claim 1, wherein said second metallic material of the or each cathode is a plated layer over said substrate.

8. A process according to claim 7, wherein the substrate of the or each cathode has an uneven surface with exposed, unplated raised portions and trough portions plated with said second metallic material, the unplated raised portions and plated second metallic material providing said interfaces which contact the liquid waste material.

9. A process according to claim 7, wherein the or each plated cathode is scored to provide said interfaces which contact the liquid waste material.

10. A process according to claim 1, wherein the liquid waste material is also anaerobically treated.

11. A process according to claim 1, wherein decomposed gaseous products are vented to atmosphere, collected or combusted.

12. A process according to claim 1, wherein the liquid waste material, after passing between and contacting said electrodes, is recirculated for further treatment involving a further passage between and in contact with said electrodes.

13. A process according to claim 1. wherein the liquid waste material, before the or each treatment involving passing between and in contact with said electrodes, is subjected to an emulsifying process.

14. A process according to claim 13, wherein the emulsifying process comprises high speed stirring and/or the addition of an emulsifier.

15. A treatment unit for electrocatalytically treating liquid waste material according to the process claimed in claim 1, the liquid waste material containing oily, fatty and/or greasy substances, wherein the treatment unit comprises a treatment container, at least one pair of spaced apart electrodes arranged in the treatment container, means for applying a dc potential difference across the electrodes of each electrode pair, inlet means for introducing untreated liquid waste material into the container means, and outlet means for treated liquid waste material to exit from the treatment container, the or each electrode pair comprising a steel anode and a cathode spaced therefrom, and the or each cathode comprising a substrate of a first metallic material and a covering layer of a second metallic material, said first metallic material comprising a steel substrate and the second metallic material comprising nickel, cadmium, titanium or a matrix of these materials arranged to provide ferro-nickel, ferro-cadmium or ferro-titanium interfaces contacting the liquid waste material.

16. A process according to claim 14, wherein the emulsifier is a detergent.

* * * * *